Patented July 25, 1944

2,354,232

UNITED STATES PATENT OFFICE 2,354,232

BARBITURIC ACID DERIVATIVES AND THEIR SALTS

Lewis A. Walter, East Orange, N. J., assignor to The Maltbie Chemical Company, Newark, N. J., a corporation of New Jersey No Drawing. Application February 28, 1942, Serial No. 432,888

32 Claims. (Cl. 260—257)

The present invention relates to certain new and useful 5.5 disubstituted barbituric acid derivatives, and their salts, having the formula:

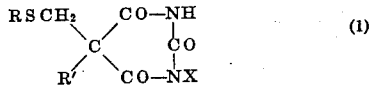 (1)

wherein R and R' are hydrocarbon groups, either saturated or unsaturated, and either the same or different, and each of which contains not more than six carbon atoms, and wherein the sum of the carbon atoms in R and R' does not exceed 10, it being understood that R has a carbon atom attached directly to the sulfur of the thio-methylene group and R' has a carbon atom attached directly to the carbon atom forming the barbituric acid nucleus; and wherein X is a member selected from the class consisting of hydrogen, alkali-metal, an equivalent of alkaline-earth metal, ammonium, mono-alkyl ammonium, dialkyl ammonium, alkanol ammonium and an equivalent of alkylene diammonium.

These novel compounds, and their salts, when tested pharmacologically, have been found to possess useful hypnotic or sedative properties, making them valuable for various medical purposes. They are, in general, white, crystalline solids.

The novel compounds according to my invention may be prepared by the application of different methods of synthesis, of which illustrative ones, the best now known to me, will now be described. In general, however, I prefer, as at present advised, to employ Method A, in the preparation of a majority of the derivatives.

ILLUSTRATIVE METHODS OF SYNTHESIS

METHOD A

This method comprises the condensation of a disubstituted malonic ester (such as may be prepared, for example, in accordance with application Serial No. 432,887, filed February 28, 1942) with urea in the presence of sodium ethylate, in an organic solvent such as, for example, absolute alcohol, as illustrated by the following equation:

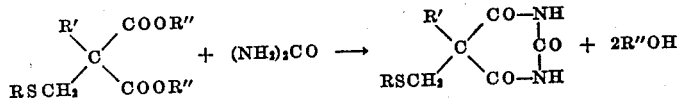

wherein R and R' have the significance stated above, and R" is a lower alkyl group. When the reaction is complete, the solvent is removed by distillation and the residue dissolved in water. The aqueous solution is then extracted with ether, and the aqueous layer is separated and acidified, yielding a precipitate of the desired barbituric acid derivative, which may then be filtered off and purified by crystallization from a suitable solvent such as ethanol.

Suitable methods for preparation of salts of the novel compounds are described hereafter.

METHOD B

A disubstituted cyano acetic ester represented by the general formula:

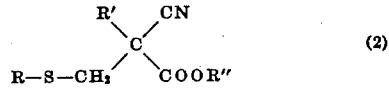 (2)

wherein R and R' have the significance stated above, and R" represents a lower alkyl group, is condensed with urea in the presence of sodium ethylate in absolute alcohol. The imino barbiturate resulting from this reaction is then hydrolyzed to the corresponding barbituric acid by refluxing with hydrochloric acid. The crude barbituric acid separating out from the acid mixture is then filtered off and recrystallized from a solvent such as ethanol, to yield a pure barbituric acid derivative.

Salts of the compounds may be prepared as hereafter described.

The following specific examples are illustrative of the novel compounds according to my invention, and of suitable methods for their preparation:

In the following illustrative examples the term "malonic ester" refers, unless otherwise indicated, to the diethyl ester of malonic acid:

EXAMPLE 1

*5-n-butyl-5-ethylthiomethylene barbituric acid*

To 1.1 moles of metallic sodium, dissolved in 500 cc. of absolute alcohol, 0.5 mole of ethylthiomethylene n-butyl malonic ester and 0.6 mole of urea are added. This mixture is refluxed on a steam bath for 12 hours, the alcohol is removed by vacuum distillation and the residue is dissolved in about 600 cc. of water. The aqueous solution is then extracted with ether and the aqueous layer is separated and acidified with acetic acid. The resulting precipitate of 5-n-butyl-5-ethyl-thiomethylene barbituric acid is filtered off and purified by crystallization from alcohol. The derivative thus obtained has a melting point of approximately 151–152° C. (uncorrected), and is represented by the following formula:

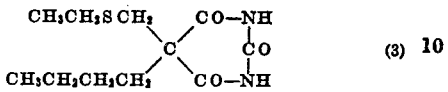

(3)

EXAMPLE 2

5-ethyl-5-n-amylthiomethylene barbituric acid

To 1.1 moles of metallic sodium, dissolved in 500 cc. of absolute alcohol, 0.5 mole of amylthiomethylene ethyl malonic ester and 0.6 mole of urea are added. This mixture is refluxed on a steam bath for 12 hours, the alcohol is removed by vacuum distillation, and the residue is dissolved in about 600 cc. of water. The aqueous solution is then extracted with ether and the aqueous layer is separated and acidified with acetic acid. The resulting precipitate of 5-ethyl-5-n-amylthiomethylene barbituric acid is filtered off and purified by crystallization from alcohol. The derivative thus obtained has a melting point of approximately 107.5–108.5° C. (uncorrected), and is represented by the following formula:

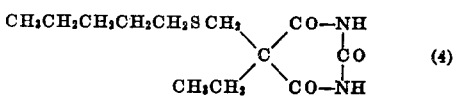

(4)

EXAMPLE 3

5-ethyl-5-allylthiomethylene barbituric acid

To 1.1 moles of metallic sodium, dissolved in 500 cc. of absolute alcohol, 0.5 mole of allylthiomethylene ethyl malonic ester and 0.6 mole of urea are added. This mixture is refluxed on a steam bath for 12 hours, the alcohol is removed by vacuum distillation, and the residue is dissolved in about 600 cc. of water. The aqueous solution is then extracted with ether and the aqueous layer is separated and acidified with acetic acid. The resulting precipitate of 5-ethyl-5-allylthiomethylene barbituric acid is filtered off and purified by crystallization from alcohol. The derivative thus obtained has a melting point of approximately 165–166° C. (uncorrected), and is represented by the following formula:

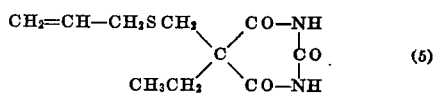

(5)

EXAMPLE 4

5-ethyl-5-cyclohexylthiomethylene barbituric acid

To 1.1 moles of metallic sodium, dissolved in 500 cc. of absolute alcohol, 0.5 mole cyclohexylthiomethylene ethyl malonic ester, and 0.6 mole of urea are added. This mixture is refluxed on a steam bath for 12 hours, the alcohol is removed by vacuum distillation and the residue is dissolved in about 600 cc. of water. The aqueous solution is then extracted with ether and the aqueous layer separated and acidified with acetic acid. The resulting precipitate of 5-ethyl-5-cyclohexylthiomethylene barbituric acid is filtered off and purified by crystallization from alcohol. The derivative thus obtained has a melting point of approximately 162° C. (uncorrected), and is represented by the following formula:

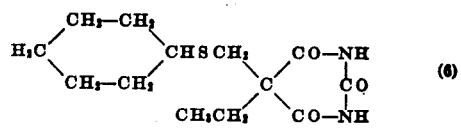

(6)

EXAMPLE 5

5-ethyl-5-tertiary-butylthiomethylene barbituric acid

To 1.1 moles of metallic sodium, dissolved in 500 cc. of absolute alcohol, 0.5 mole of tertiary-butylthiomethylene ethyl malonic ester and 0.6 mole of urea are added. This mixture is refluxed on a steam bath for 12 hours, the alcohol is removed by vacuum distillation and the residue is dissolved in about 600 cc. of water. The aqueous solution is then extracted with ether and the aqueous layer separated and acidified with acetic acid. The resulting precipitate of 5-ethyl-5-tertiary-butylthiomethylene barbituric acid is filtered off and purified by crystallization from alcohol. The derivative thus obtained has a melting point of approximately 186.5–187° C. (uncorrected), and is represented by the following formula:

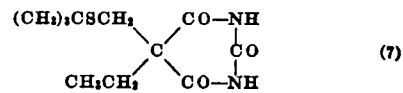

(7)

EXAMPLE 6

5-n-butyl-5-n-butylthiomethylene barbituric acid

To 1.1 moles of metallic sodium, dissolved in 500 cc. of absolute alcohol, 0.5 mole of n-butylthiomethylene n-butyl cyano acetic ester, having a boiling point of approximately 150–155° C. at about 1 mm. pressure, and 0.75 mole of urea are added. This mixture is refluxed on a steam bath for 12 hours, the alcohol is removed by vacuum distillation, and the residue is dissolved in about 600 cc. of water. The aqueous solution is extracted several times with ether, and the aqueous layer is separated and acidified with concentrated hydrochloric acid. When just acid, an equal volume of concentrated hydrochloric acid is then added and the mixture is refluxed for 1 hour. On cooling, the crude barbituric acid separates and is then recrystallized from alcohol to yield 5-n-butyl-5-n-butylthiomethylene barbituric acid, having a melting point of approximately 106–108° C. (uncorrected), and is represented by the following formula:

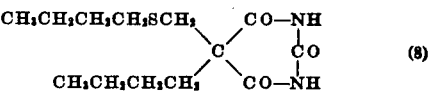

(8)

In the preparation of the novel barbituric acid derivatives and their salts according to my invention, I have discovered that the substituent groups R and R', as described and defined above, may be varied considerably, within those limits, while producing good results and useful and valuable compounds; and among the derivatives specifically included in the invention are the following illustrative examples of my novel derivatives, all of which I have prepared, and which, when tested pharmacologically, were found to possess valuable and useful properties as hypnotics or sedatives:

Barbituric acid

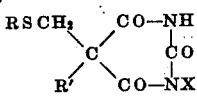

wherein:

| R is— | R' is— | Approximate melting point, °C. |
|---|---|---|
| Methyl | Isobutyl | 129.5-132.5 |
| Ethyl | Methyl | 149.5-151 |
| Do | Ethyl | 161-162 |
| Do | n-Propyl | 169-170 |
| Do | Isopropyl | 138-139 |
| Do | Allyl | 131-132 |
| Do | n-Butyl | 151-152 |
| Do | Isobutyl | 146.5-147 |
| Do | Sec.-butyl | 128-131 |
| Do | 2-methylallyl | 133-133.5 |
| Do | Isoamyl | 121-122 |
| Do | 1-methylbutyl | 103-106 |
| Do | n-Hexyl | 110.5-111.0 |
| Do | Δ-1-cyclohexenyl | 170-171.5 |
| n-Propyl | Ethyl | 131-132 |
| Do | Allyl | 105.5-106.5 |
| Isopropyl | Ethyl | 152-153 |
| Do | Isopropyl | 133.5-134.5 |
| n-Butyl | Methyl | 144-146 |
| Do | Ethyl | 106.5-107.5 |
| Do | n-Propyl | 129-130.5 |
| Do | Isopropyl | 129-129.5 |
| Do | Allyl | 99-100 |
| Do | n-Butyl | 106-108 |
| Do | Isobutyl | 112-113 |
| Do | Sec.-butyl | 121-122 |
| Isobutyl | Ethyl | 154.5-155.5 |
| Sec.-butyl | do | 130-130.5 |
| Tert.-butyl | do | 186.5-187 |
| n-Amyl | do | 107.5-108.5 |
| Isoamyl | do | 120-121 |
| 1-methylbutyl | do | 106.5-107.5 |
| n-Hexyl | do | 103.5-104.5 |
| Cyclohexyl | do | 162 |
| Allyl | do | 165-166 |
| 2-ethylbutyl | do | 127-128 |

In the foregoing examples, the melting points are approximate and uncorrected; but are those which I actually observe, according to a procedure believed to be reliable.

SALTS OF THE NOVEL BARBITURIC ACID DERIVATIVES

Many sodium salts of the barbituric acids described above may be prepared by dissolving 1 mole of the disubstituted barbituric acid in the minimum quantity of hot absolute alcohol and adding a solution containing one equivalent of sodium in absolute alcohol. On cooling, or on evaporation of the alcohol, the sodium salt separates as crystals, or in amorphous form. In some instances a syrup results and this material, when stirred with dry ether, gives the sodium salt in amorphous form.

Other alkali-metal salts may also be derived by a similar procedure.

The sodium salts of my novel barbituric acid derivatives have been found to be readily soluble in water, and their aqueous solutions are alkaline in reaction. When administered orally or hypodermically in proper dosage they are good and useful hypnotics or sedatives, and range in duration of action from long to ultra-short acting.

Calcium salts may be prepared by treating an absolute alcohol solution of the sodium salt with the metathetical amount of alcoholic calcium chloride, filtering off the precipitated sodium chloride and concentrating the alcoholic solution to yield the calcium salt.

The ammonium, alkyl and alkanol ammonium salts may be prepared by dissolving the corresponding barbituric acid in an excess of ammonia or amine and subsequently removing the excess quantity of base.

In the following claims it is to be understood that "barbituric acid derivative" and similar expressions, includes, also, the salts of such derivatives, such as, for example, the salts described above.

The examples given above, and illustrative processes for their production, include the best embodiments of my present invention now known to me; but it is to be understood that the invention is not necessarily or specifically limited thereto and may, under proper conditions, have other embodiments, produced in other ways, without departure from the spirit of the invention, and within the scope of the following claims.

What is claimed is:

1. As a new and useful composition of matter, a 5,5 disubstituted barbituric acid derivative having the formula $$\begin{array}{c} RSCH_2 \\ \diagdown \\ R' \end{array} C \begin{array}{c} CO-NH \\ \diagdown \\ CO-NX \end{array} CO$$

wherein R and R' are hydrocarbon groups, each of which contains not more than six carbon atoms, and wherein the sum of the carbon atoms in R and R' does not exceed 10, R has a carbon atom attached directly to the sulfur of the thiomethylene group, and R' has a carbon atom attached directly to the carbon atom forming the barbituric acid nucleus; and wherein X is a member selected from the class consisting of hydrogen, alkali-metal, an equivalent of alkaline-earth metal, ammonium, mono-alkyl ammonium, dialkyl ammonium, alkanol ammonium, and an equivalent of alkylene diammonium.

2. A composition of matter according to claim 1 in which at least one of the R and R' groups is a primary hydrocarbon group.

3. A composition of matter according to claim 1 in which X represents hydrogen.

4. A composition of matter according to claim 1 in which R and R' are both primary hydrocarbon groups.

5. A composition of matter according to claim 1 in which R and R' are both primary hydrocarbon groups and X represents hydrogen.

6. A composition of matter according to claim 1 in which R is a secondary hydrocarbon group and R' is a primary hydrocarbon group.

7. A composition of matter according to claim 1 in which R is a secondary hydrocarbon group, R' is a primary hydrocarbon group and X represents hydrogen.

8. A composition of matter according to claim 1 in which R is a primary hydrocarbon group and R' is a secondary hydrocarbon group.

9. A composition of matter according to claim 1 in which R is a primary hydrocarbon group, R' is a secondary hydrocarbon group and X represents hydrogen.

10. A composition of matter according to claim 1 in which R' is a primary hydrocarbon group.

11. A composition of matter according to claim 1 in which R' is a primary hydrocarbon group and in which X represents hydrogen.

12. A composition of matter according to claim 1 in which R is a primary hydrocarbon group and R' is an ethyl group.

13. A composition of matter according to claim 1 in which R is a primary hydrocarbon group, R' is an ethyl group and X represents hydrogen.

14. A composition of matter according to claim 1 in which R is a primary hydrocarbon group containing 5 carbon atoms and R' is a primary hydrocarbon group.

15. A composition of matter according to claim 1 in which R is a primary hydrocarbon group containing 5 carbon atoms, R' is a primary hydrocarbon group and X represents hydrogen.

16. A composition of matter according to claim 1 in which R is a primary hydrocarbon group containing 5 carbon atoms and R' is an ethyl group.

17. A composition of matter according to claim 1 in which R is a primary hydrocarbon group containing 5 carbon atoms, R' is an ethyl group and X represents hydrogen.

18. A composition of matter according to claim 1 in which R is an n-amyl group and R' is a primary hydrocarbon group.

19. A composition of matter according to claim 1 in which R is an n-amyl group, R' is a primary hydrocarbon group and X represents hydrogen.

20. A composition of matter according to claim 1 in which R is an n-amyl group and R' is an ethyl group.

21. A composition of matter according to claim 1 in which R is an n-amyl group, R' is an ethyl group and X represents hydrogen.

22. A composition of matter according to claim 1 in which R is an ethyl group and R' is a secondary hydrocarbon group.

23. A composition of matter according to claim 1 in which R is an ethyl group, R' is a secondary hydrocarbon group and X represents hydrogen.

24. A composition of matter according to claim 1 in which R is a primary hydrocarbon group and R' is a secondary hydrocarbon group containing 5 carbon atoms.

25. A composition of matter according to claim 1 in which R is a primary hydrocarbon group, R' is a secondary hydrocarbon group containing 5 carbon atoms and X represents hydrogen.

26. A composition of matter according to claim 1 in which R is a primary hydrocarbon group and R' is a 1-methyl-butyl group.

27. A composition of matter according to claim 1 in which R is a primary hydrocarbon group, R' is a 1-methyl-butyl group and X represents hydrogen.

28. A composition of matter according to claim 1 in which R is an ethyl group and R' is a 1-methyl-butyl group.

29. A composition of matter according to claim 1 in which R is an ethyl group, R' is a 1-methyl-butyl group and X represents hydrogen.

30. 5-secondary-butyl - 5 - ethylthiomethylene barbituric acid.

31. 5-ethyl-5-isoamylthiomethylene barbituric acid.

32. The method of producing a 5,5 disubstituted barbituric acid derivative according to claim 1 which comprises condensing the corresponding 5,5 disubstituted malonic ester with urea in the presence of sodium ethylate in an organic solvent.

LEWIS A. WALTER.